United States Patent [19]
Zipf, III

[11] 3,785,897
[45] Jan. 15, 1974

[54] METHOD OF MAKING A DISPOSABLE DRAW SHEET

[75] Inventor: Fred W. Zipf, III, Rumson, N.J.

[73] Assignee: Blessings, Inc., Bound Brook, N.J.

[22] Filed: Mar. 6, 1972

[21] Appl. No.: 232,312

Related U.S. Application Data

[62] Division of Ser. No. 860,564, Sept. 24, 1969, Pat. No. 3,646,624.

[52] U.S. Cl. .............................. 156/201, 156/204
[51] Int. Cl. .......................... B31f 1/00, A47g 9/00
[58] Field of Search.................. 156/201, 204, 227, 156/269; 5/334 R, 334 C, 335 R

[56] References Cited
UNITED STATES PATENTS

| | | | |
|---|---|---|---|
| 3,407,414 | 10/1968 | Burns et al. | 5/335 |
| 2,779,035 | 1/1957 | McMurry | 5/334 R |
| 2,001,693 | 5/1935 | Rockwood | 156/201 |
| 3,384,908 | 5/1968 | Janapol | 5/334 R |

Primary Examiner—Douglas J. Drummond
Assistant Examiner—Basil J. Lewris
Attorney—Sandoe, Hopgood & Calimafde

[57] ABSTRACT

This method of making a draw sheet, suitable for hospital use, has plastic film to which is laminated a highly absorbent non-woven fabric over only that portion of the sheet which is on top when in use. The method is a continuous process that advances the web of plastic film from a supply roll and progressively folds film from both sides of the web over the top of the mid portion which is to be laminated to the absorbent material. The web becomes in effect a flattened tube. A web of the unwoven absorbent material is fed to the lower side of the flattened tube after adhesive has been applied to one of the webs to secure the absorbent material to the mid portion of the plastic web (i.e., bottom of the flattened tube). The laminated webs are cut into draw sheet length by a flying shear.

9 Claims, 8 Drawing Figures

PATENTED JAN 15 1974 3,785,897

METHOD OF MAKING A DISPOSABLE DRAW SHEET

This application is a division of application Ser. No. 860,564, filed Sep. 24, 1969, now U.S. Pat. No. 3,646,624.

BACKGROUND AND SUMMARY OF THE INVENTION

In hospitals, draw sheets are used to protect the bedding on the mattress from soiling or wetting by the patient. Cloth draw sheets are used above the regular bedding and plastic or rubber sheets are normally placed under the regular sheet. In both cases the sheet is drawn across the bed and secured under the mattress on each side.

This invention provides a disposable draw sheet which is a laminated product with a plastic portion that extends across the top of the mattress and that tucks under the mattress on both sides, and which also provides an absorbent portion bonded to the top surface of the plastic over the mid region of the sheet which constitutes the part that covers the top of the mattress and that comes in contact with the patient.

The method of this invention takes a plastic web from a supply reel and folds the plastic back along both longitudinal edge regions to leave a mid region between the folds that is the approximate width of the top of the mattress for which the draw sheet is intended. The unfolded part of the plastic web is coated on its underside with adhesive and after the web has traveled far enough for the adhesive to become tacky, the absorbent portion, preferably a cellulose non-woven fabric, is brought into contact with the plastic portion between the fold lines and is bonded to the plastic portion by adhesive of a consistency that does not fill up the interstices of the absorbent portion.

The traveling webs, attached to one another, are cut apart to form individual draw sheets that have a width extending transversely of the length of the webs. The length of the draw sheet is the distance between cuts and the plastic portion and the absorbent portion have the same length.

Other objects, features and advantages of the invention will appear or be pointed out as the description proceeds.

BREIF DESCRIPTION OF DRAWINGS

In the drawing, forming a part hereof, in which like reference characters indicate corresponding parts in all the views.

DESCRIPTION OF PREFERRED EMBODIMENTS

Figure 1:
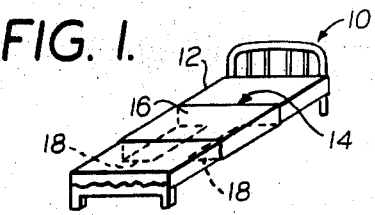
FIG. 1 is a diagrammatic, isometric view of a bed having a mattress and a draw sheet in position on the mattress.

FIG. 1 shows a bed 10 on which there is a mattress 12, having a draw sheet 14 across the top of the mattress and tucked in under the sides of the mattress in accordance with conventional practice. A mid region 16 of the draw sheet covers the top of the mattress and is the part of the draw sheet with which a patient in the bed comes in contact. Edge regions 18 of the draw sheet are shown in dotted lines tucked in between the mattress 12 and the springs of the bed.

Figure 2:
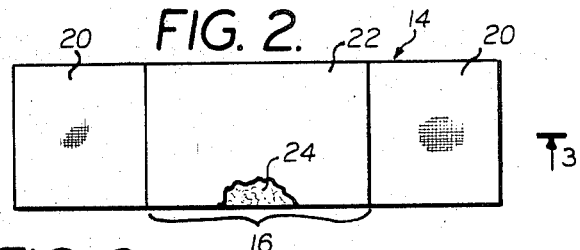
FIG. 2 is a greatly enlarged top plan view of the draw sheet of this invention when in a flat condition and before being applied to a mattress.

FIG. 2 shows the draw sheet 14 in an unfolded condition. The draw sheet has a plastic portion 20 which extends for the full width of the draw sheet and there is an absorbent portion 22 covering the mid region 16 of the plastic portion 20.

Figure 3:
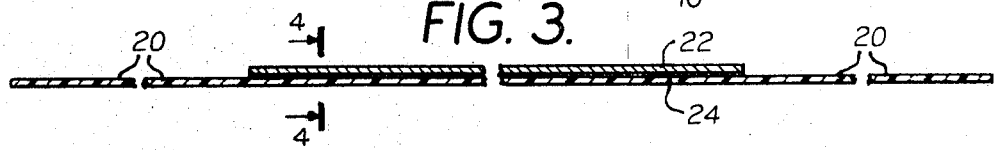
FIG. 3 is a greatly enlarged, fragmentary, sectional view taken on the line 3—3 of FIG. 2.

The absorbent portion 22 is secured to the plastic portion 20 by adhesive 24. In FIG. 2 the absorbent portion 22 is broken away at its lower right-hand corner to expose the adhesive 24. In FIG. 3 the adhesive is indicated by the heavy line 24.

Figure 4:
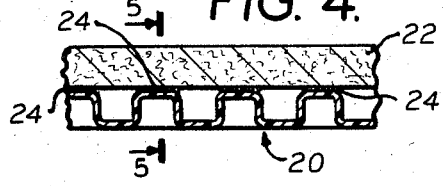
FIG. 4 is a greatly enlarged sectional view taken on the section line 4—4 of FIG. 3.
Figure 5:
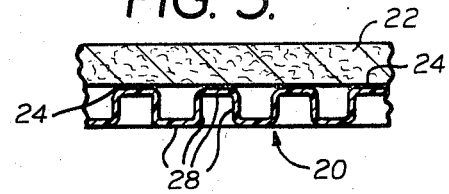
FIG. 5 is a sectional view taken on the line 5—5 of FIG. 4.

FIGS. 4 and 5 are sectional views on a much larger scale than the other views and show the contour of the plastic portion 20. It has an undulating top surface 28 which is made by giving the plastic an embossed waffle pattern. The adhesive 24 actually covers only the high parts of the top surface of the plastic portion 20. This has the advantage of leaving some space under the absorbent portion 22 and thus increases the amount of water that the draw sheet will retain. It also increases the flexibility of the draw sheet over the mid region where the absorbent portion 22 is secured or bonded to the plastic portion 20.

It will be understood that the invention can be made with a flat plastic film, if desired, and that a woven absorbent fabric can be used, but this increases the expense of the product without commensurate advantages.

The plastic portion 20 is preferably made of polyethylene and in the preferred construction the polyethylene is colored so that it is easy to separate the disposable items and the reusable sheets when stripping a bed. This eliminates danger that some of the white sheets of the bed may be thrown away with the disposable draw sheets. Polyethylene of a thickness of approximately 0.001–0.002 inch has been used effectively for this invention. Other equivalent plastic material can be used, such as polyvinyl chloride or polypropylene sheet.

The absorbent portion 22 is preferably a non-woven cellulose fabric having a thickness of approximately ¾ to 1½ oz. per sq. yd.

The adhesive 24 must be of a consistency, when the absorbent material 22 is brought in contact with it, that will not fill up some of the interstices of the absorbent material, thereby decreasing its water-absorbing capacity. In the preferred construction, the adhesive is a composition which becomes tacky shortly after being applied to the plastic 20, and which remains tacky and flexible permanently. Suitable adhesives include Chemtac No. P 777 Chemionics Inc. 20–21 Wagraw Rd., Fairlawn, N.J.; Fuller No. 3468 and 3017 H.B. Fuller Co.,Brunswick Ave.,Edison,N.J.

Figure 6:
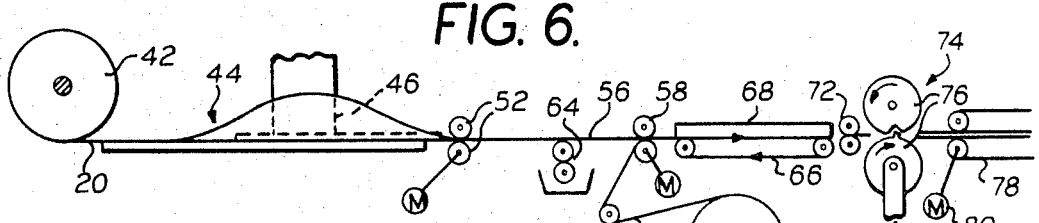
FIG. 6 is a diagrammatic side elevation illustrating the method by which the draw sheets of this invention are made.
Figure 7:
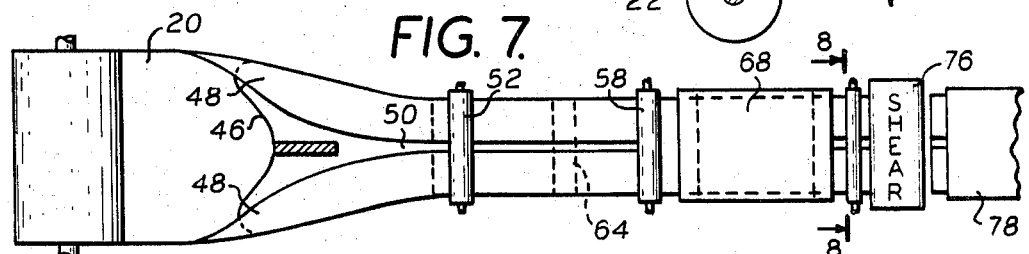
FIG. 7 is a top plan view of the apparatus illustrating the method of FIG. 6.
Figure 8:
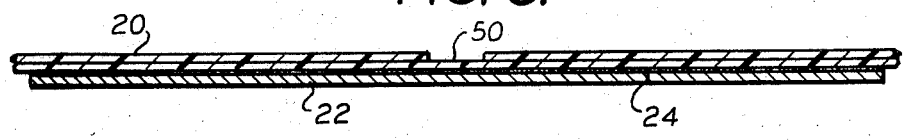
FIG. 8 is a greatly enlarged sectional view taken on the line 8—8 of FIG. 7.

FIGS. 6-8 show the preferred method of this invention for making the draw sheet illustrated in the other figures. A web of the plastic material 20 comes from a supply reel 42 and moves progressively through a folding station 44 at which a folder 46 turns the edge region 48 over the mid portion of the web to form a flattened tube. In the preferred method, the turned-over edge portions 48 have a combined width substantially equal to the unfolded mid portion and this produces a flattened tube having a longitudinal seam 50. The seam 50 is shown open in FIGS. 7 and 8, but it can be a lap seam. The advantage of having the seam 50 slightly open is that it avoids an extra thickness of material along a localized portion of the width of the flattened tube, but such a condition is not critical. The tube can be made with a wide gap between the opposite edges of the web, but since the folded edge regions include the portions the the draw sheet which extend down the sides of the mattress, it is advantageous to have the edge regions wide enough to leave ample material for tucking in under the mattress to hold the draw sheet tight.

Driven feed rolls 52 constitute part of the apparatus at the folding station and these feed rolls 52 advance the flattened tube with continuous motion.

The flattened tube, designated by the reference character 56, passes through another feed roll stand 58 to which a web of the absorbent material 22 is supplied from a supply reel 60. The web of absorbent material 22 is brought in contact with the bottom surface of the flattened tube 56 at the feed roll stand 58 and adhesive is applied to this bottom surface by an applicator 64 located ahead of the feed roll stand 58.

The spacing of the applicator 64 from the feed roll stand 58 is correlated with the speed of travel of the flattened tube 56 and with the characteristics of the adhesive, which is dispensed by the applicator 64, so as to leave time for the adhesive to become tacky before it enters the feed roll stand 58.

The plastic material of the flattened tube 56 and the absorbent material 22 from the reel 60 are pressed together, with adhesive between them, in the feed roll stand 58; and they are held in contact with one another as they travel with the top run of an endless belt 66 which presses the webs against a top plate 68. Other feed rolls 72 advance the connected webs to a cutoff station 74 where the connected webs are cut at longitudinally spaced regions to produce individual draw sheets. FIG. 6 shows a flying shear 76 for severing the attached webs, but other cutoff means can be employed.

The severed draw sheets are taken from the cutoff station by a conveyor 78 which is shown diagrammatically as two endless belts located above and below the severed sheets and driven by a motor 80.

The preferred embodiments of the invention have been illustrated and described and the invention is defined in the appended claims.

What is claimed is:

1. The method of making a disposable draw sheet having a plastic portion of a width that extends across the top of a mattress and that tucks under the sides thereof, and having an absorbent portion on top of the plastic portion and of less width than the plastic portion over the mid region of the draw sheet and with which the bed patient has contact, which method comprises advancing a plastic web in the direction of its length, progressively folding the edge regions of the web over the mid region and into contact therewith as the web advances, advancing a web of absorbent material in the same direction as the plastic web and at substantially the same speed, bringing the absorbent material into contact with the unfolded mid-region on the other side thereof from the side of the med-region with which the folded edge regions contact and at a location beyond that at which the edges of the web are folded over the mid-region, and applying adhesive to at least one of the advancing webs before they are brought into contact with one another.

2. The method described in claim 1 characterized by folding the plastic web to bring the opposite edges thereof into close and parallel relationship with one another on top of the mid region of the plastic web, and applying the adhesive continuously to the bottom of the plastic web across substantially the full width of the plastic web between the folds, and bringing into contact with the bottom of the plastic web an absorbent web having a width as wide as the adhesive-coated area of the plastic web, and pressing the advancing webs into contact with one another to effect a bonding by the adhesive.

3. The method described in claim 2 characterized by applying the adhesive to the plastic web at a location ahead of that where the webs are brought into contact with one another, and correlating the speed of travel of the web and the characteristics of the adhesive to obtain time for the adhesive to become tacky before it is brought into contact with the absorbent web.

4. The method described in claim 1 characterized by folding over the edges of the plastic web far enough to leave the region of the edges of the plastic web between the folds of substantially the same width as the web of the absorbent material.

5. The method described in claim 4 characterized by applying the adhesive continuously to substantially the full width of the plastic between the folds, spacing the location at which the webs are brought together beyond the adhesive application far enough for the adhesive to become tacky before the webs are brought into contact with one another, holding the webs together with the folded over the edge regions pressed flat against the mid region and with pressure applied to the top of the folded over edge region of the plastic portion and to the bottom of the absorbent portion to secure the plastic and absorbent portions to one another by the adhesive as they travel progressively beyond the location at which they are brought together, and severing the united webs as they come from the holding step and while in continuous motion to produce individual draw sheets.

6. The method of making a disposable hospital draw sheet of a width that extends across the mattress of a bed and down the sides of the mattress and with ends that tuck under both sides of the mattress, which method comprises unrolling from a reel a waterproof plastic web having a width equal to the desired width of the draw sheet, advancing the web with continuous motion as it unrolls from the reel, folding the web while it advances and by said folding forming the web to form a flat tube with a longitudinal seam, applying adhesive to the flat tube on the side opposite to the seam of the flat tube, unrolling an absorbent non-woven fabric, that is somewhat narrower than the flat tube, from a reel with continuous motion, applying the non-woven fabric to the plastic web downstream from the adhesive-applying station and at a location where the adhesive is still sticky, pressing the non-woven fabric into firm contact with the web to bond the absorbent non-woven material to the plastic web as they travel together with continuous motion, and severing the assembled web and non-woven fabric at spaced locations along the flat tube to make individual draw sheets.

7. The method described in claim 6 characterized by folding the plastic web to form a flat tube with the edges of the web confronting one another at an open seam of the tube.

8. The method described in claim 6 characterized by applying rolling pressure to both sides of the flattened tube through the folding step. The method described in claim 6 characterized by applying the adhesive as a coating on the face of the non-woven fabric and in a limited amount that leaves the rest of the non-woven fabric water absorbent.

* * * * *